Sept. 16, 1930.      R. FRANCHOT ET AL      1,775,955
BLAST FURNACE
Filed Aug. 6, 1928      2 Sheets-Sheet 1
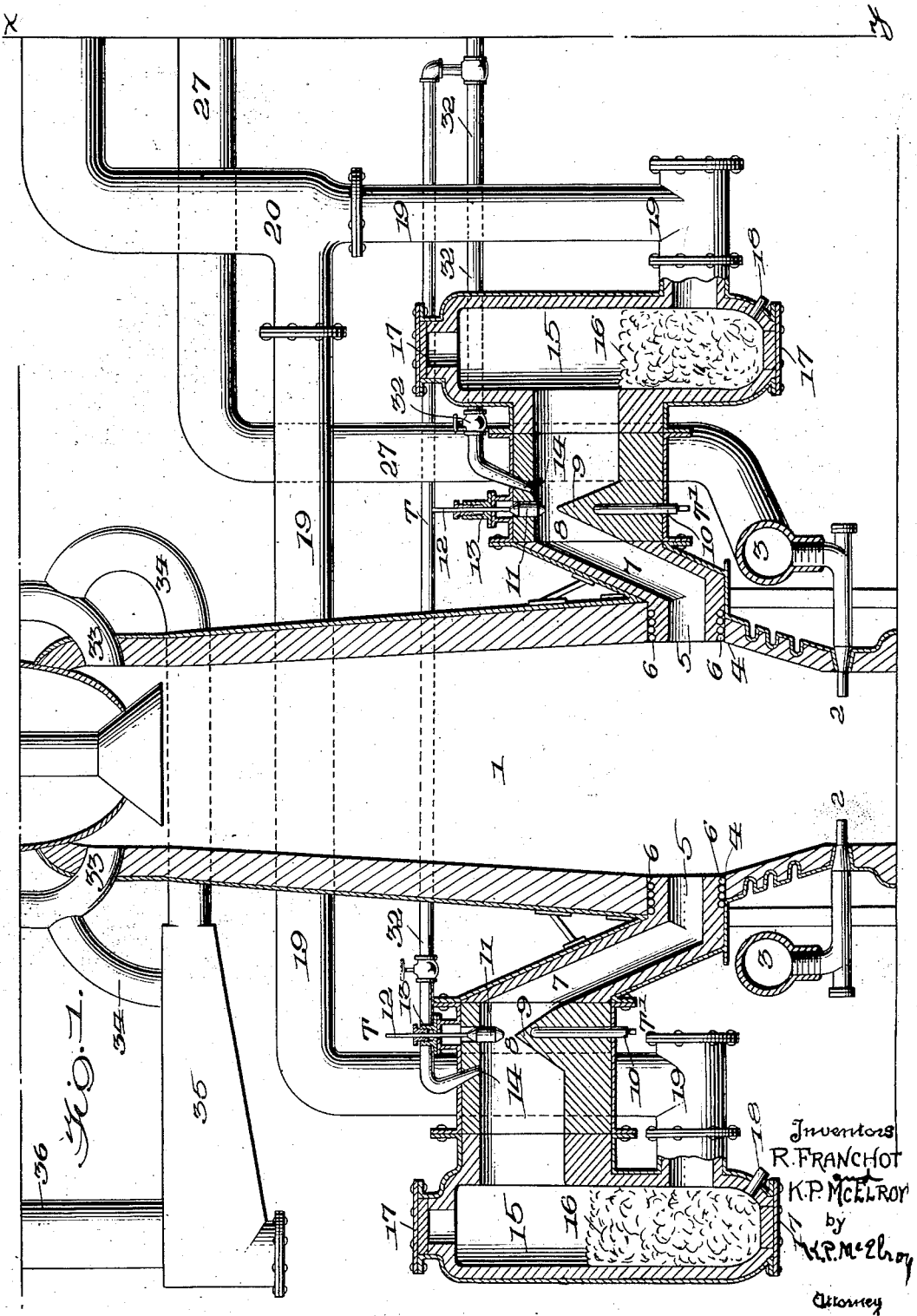

Sept. 16, 1930.    R. FRANCHOT ET AL    1,775,955
BLAST FURNACE
Filed Aug. 6, 1928    2 Sheets-Sheet 2
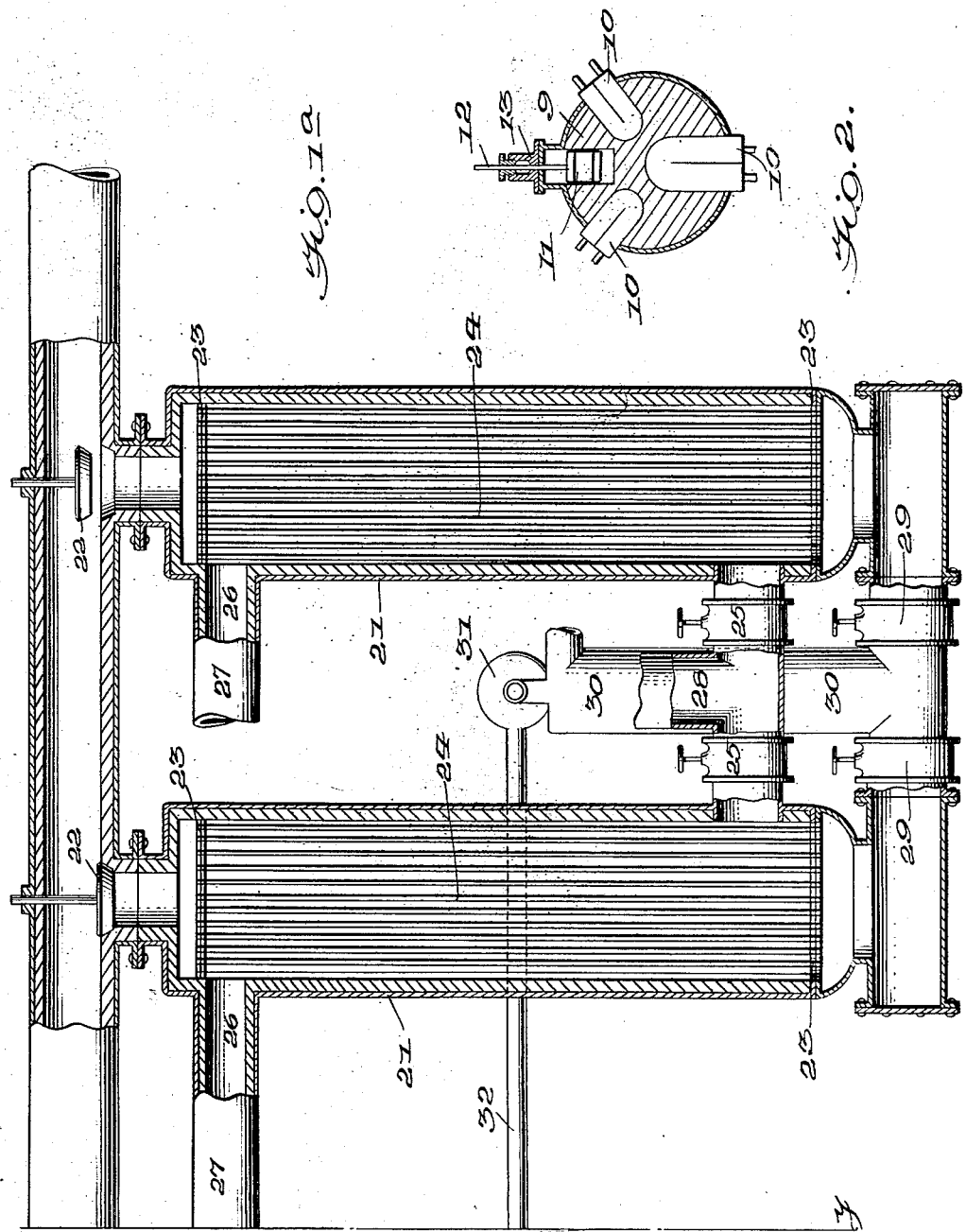
Inventors
R. FRANCHOT
K. P. McELROY
By K. P. McElroy
Attorney.

Patented Sept. 16, 1930

1,775,955

UNITED STATES PATENT OFFICE

RICHARD FRANCHOT AND KARL P. McELROY, OF WASHINGTON, DISTRICT OF COLUMBIA, ASSIGNORS TO FERRO CHEMICALS, INC., OF WASHINGTON, DISTRICT OF COLUMBIA, A CORPORATION OF DELAWARE

BLAST FURNACE

Application filed August 6, 1928. Serial No. 297,754.

This invention relates to improvements in blast furnaces; and it comprises a furnace of the type usual in smelting iron ores with carbonaceous fuel and a preheated air blast, said furnace having one or more refractory conduits of wide cross-sectional area leading gas out of the hot zone of said furnace above the air tuyères, a narrow refractory pressure releasing adjustable nozzle constriction in each of said conduits restricting the effective area thereof and delivering a rapid jet of gas, velocity being obtained at the expense of pressure, a nozzle directing a jet of cold gas into the jet of hot gas delivered by each hot gas nozzle, a settling and filtering chamber connected to each of said conduits near said nozzles, a plurality of heat interchangers receiving gas from said chambers, said interchangers being adapted to continuously heat the air blown into the furnace while cooling the gas and means for returning a fraction of the cooled gas to said cold gas nozzles; all as more fully hereinafter set forth and as claimed.
In the hundred years which have followed the invention of the hot blast the blast furnace plant for smelting iron has become a highly standardized assembly of apparatus elements. In this assembly the regenerative checker brick hot blast stove has become increasingly important. By means of increasing stove capacity imparting a high temperature to an increasing volume of air blast, furnace performance has been improved chiefly by way of increasing productive capacity until individual furnaces today, no larger than some of those in use 50 years ago, have been through faster and faster driving made to produce 20 times more iron. In other words, the speed of furnace operation has been progressively increased by means of mechanical improvement of the charging, blowing and blast heating apparatus, permitting the charging of more coke and ore, the blowing and heating of more and more air and the production of more and more fuel gas. With this increasing productive capacity however, there has been little change in the relative efficiency of fuel utilization, the production of iron per unit of coke having remained, with smelting materials of equal purity, practically constant. Specifically, the smelting work of the standard furnace, comprising reduction of oxids, decarbonation of flux carbonates, with melting and heating of metal and slag, accounts at best for less than 40 per cent of the calorific energy of the coke including blast heat, while usually substantially more than 40 per cent of this energy is rejected as the latent calorific energy of the carbon monoxid and hydrogen in the top gas. In general, the rejection as carbon monoxid of 60 to 80 per cent of the coke carbon constitutes a loss of energy to the furnace itself equivalent to about half of the coke charged; the loss being only partially recuperated through using the low grade top gas as fuel in hot blast stoves and in power plants or steel mills. The fact that in the past no means was known by which the blast furnace could be prevented from being more gas producer than iron smelter has determined the development of the plant assembly to its present standardized form in which the checker brick stoves with elaborate gas cleaning apparatus have become increasingly important but expensive means both of utilizing a large part of the by-product gas and of holding the gas production to a certain minimum through such limited control of smelting efficiency as has been afforded by an ample supply of blast heat. However, heating the air blast to high temperatures has itself in many cases not only necessitated production by the furnace of an undue proportion of fuel gas but has as well increased this gas production through undue addition of heat.

Prior patents, notably 1,466,644 of August 28, 1923, and 1,555,783 and 1,555,784 of September 29, 1925, also application Serial No. 112,667, filed May 29, 1926, have described a method of improving smelting efficiency to a point far beyond the previous standard. In this method the furnace is provided with a gas outlet in the smelting zone, a substantial proportion of the hot gas produced by the air in the hearth being diverted from the furnace through this outlet, the amount of the combustion gases caused to flow up through the shaft being so proportioned that the higher the blast temperature the greater is the flow of gas through the shaft and the less is the hot gas diversion. These inventions are related to a discovery of the fact that the endothermic chemical activity of the air nitrogen in the combustion zone is a substantial factor limiting the development of heat in the hearth and thereby necessitating the combustion of the great excess of coke and the consequent product of the great amount of fuel gas which has been the outstanding feature of standard blast furnace practice in the past. These prior inventions have contemplated using regenerative brick stoves of standard type to produce the highest practicable blast temperatures, the volume of hot gas diverted being however inversely proportioned to the blast heat.

In a copending application, Serial No. 262,047, filed March 15, 1928, is described and claimed a blast furnace process wherein the temperature of the blast is definitely limited, the amount of hot gas diverted is likewise limited while the burden ratio is made great enough to use substantially all the energy of the undiverted gas, so that the top gas is completely spent. In this process the rate of hot gas diversion is proportioned directly with the blast temperature. As the heat needed in the blast is increased, the diversion of gas is made greater. The sensible heat of the diverted gas may alone be sufficient to supply the blast heat, the process being so operable that none of the diverted gas need be burned in order to provide the moderate heat required for the blast; all of the latent combustion energy of the diverted gas being thus made available for power purposes.

It is an object of the present invention to effect substantial savings in the cost of plant installation and maintenance in the blast furnace smelting of iron. A further object is to provide a plant smooth and uniform in operation, one in which full advantage can be taken of the economies possible with the diversion from the furnace of hot producer gas having relatively high calorific value. It is a particular object to adapt the blast furnace assembly to the improved cool blast process of iron smelting in which the rate of hot gas diversion is proportioned directly with the blast heat. It is a concurrent object to improve the means for withdrawing hot gases carrying condensible vapors from the furnace and the means for separating such condensible matter from the gases.

The present invention comprises a blast furnace of the type commonly used in making pig iron but having the bosh angle somewhat nearer to the tuyères than heretofore and having openings of substantial area in the inwall above the bosh, upwardly directed refractory lined and heat insulated conduits leading gas from the furnace through these openings, the effective area of the openings and conduits being restricted, in order to limit and control the velocity of gas flow from the furnace, by constricted, refractory, heat insulated pressure releasing passages forming nozzles located in the conduits at levels substantially above that of the wall openings. Near the nozzles the conduits are provided with means for directing jets of cold gas into the jets of hot furnace gas from the nozzles, the conduits then widening out and delivering through large insulated settling chambers containing refractory gas filtering material into a common gas main leading to a plurality of metallic heat interchangers connected in parallel and adapted to directly transfer sensible heat from the hot filtered gas to the air blown into the furnace through the tuyères, the interchangers being also adapted to deliver cooled gas to a gas main leading to boilers or gas engines supplying power to the air blowing engines, means being provided for returning a fraction of the cooled gas to the constricted conduits delivering into the filtering chambers.

In the above described apparatus, the constricted, refractory, heat insulated nozzle converting pressure into velocity is an important element. It is located in its respective refractory, heat insulated conduit at a level well above that of the opening through the furnace wall. It is so placed with reference to its combined settling and filtering chamber that it delivers gas into the latter with sudden release of pressure in the form of a jet or rapid swirling stream slowing down with dropping temperature and deposition of condensible salines. To get the full benefit of this nozzle effect the wall opening and conduit are made very wide and the constriction very narrow. The constriction may well be to a cross-sectional area one hundredth that of the wall opening and conduit proper. Thus the flow of large volumes of gas from within the furnace is made relatively slow, the gas pressure and temperature in the conduit are substantially the same as inside the furnace, the pressure is suddenly dropped through the jet-forming constriction in the conduit and the gas is delivered in a rapid, swirling, expanding and cooling stream into the settling and filtering chamber. There the gas flows into and mixes with the already expanded and cooled gas in the chamber. We have found that the nozzle effect of a wide conduit having a narrow, refractory, heat insulated constriction delivering directly into a cooled chamber aids materially in removing saline matter such as alkali cyanid from the gas. Both the nozzle effect and the cooling are enhanced by means of a nozzle placed near the conduit constriction and adapted to direct a jet of cold gas into the jet of hot gas streaming through the constriction. The combined effect of the conduit constriction, the cold gas nozzles and the settling and filtering chambers is to substantially clean the gas while still at an elevated temperature, with recovery of valuable saline products. This effect makes possible a practically continuous operation of the hot gas outlet with the heat interchangers returning sensible heat from the hot gas to the furnace via the air blast, with great economy of heat. An important contribution to these effects is made by the plurality of gas conduits leading from the furnace, each conduit having a jet forming constriction provided with a cold gas nozzle and delivering directly into its respective gas cleaner. Advantageously, the constriction is formed by a movable refractory plug engaging with a tapered conduit wall.

The accompanying drawings show, more or less diagrammatically, one embodiment of the invention.

Figures 1 and 1A taken together, connected along the line X—Y give a view in vertical section of a blast furnace assembly within the invention, certain parts being in elevation, and Figure 2 shows a refractory throttle in vertical section at right angles to the view of Figure 1 on the planes T—T'.

In this showing the structure 1 represents a brick-lined blast furnace having air tuyères 2 supplied by bustle pipe 3 and having its bosh angle at 4. The vertical distance between the tuyère level and the top of the bosh may be less than one-eighth of the total height of the furnace. In the thick refractory inwall above the bosh are openings 5 which may be from two to six in number at regular intervals around the circumference of the furnace; the walls near the openings being protected by cooling water coils 6. The openings may be from three to six feet in diameter or even larger. The number and size of openings are proportioned to the capacity of the furnace and the rate of driving. The openings may be placed between the vertical planes of the tuyères. Attached to the furnace shell around these openings are conduits 7 comprising steel casings lined with refractory material, such as fire brick, adapted to withstand the action of the hot furnace gases, these conduits extending upward and being of an internal cross sectional area about the same as that of their respective wall openings. In each conduit at a level substantially above that of the wall opening is tapered refractory, heat insulated, pressure releasing constricted forming nozzle 8 comprising shaped refractory material 9 water cooled by fittings 10 and forming an internal irregularly conical or pyramidal space, and a wedge-shaped refractory plug 11 inserted through an opening in the conduit at the apex of said space, engaging therewith and serving to restrict the effective area of the gas conduit, the plug being movable by means of bar 12 through stuffing box 13. Plug 11 may be water cooled if desired. Each nozzle is tapered down to an internal cross-sectional area much smaller than that of its respective wall opening. The nozzle orifice may well be so proportioned that the velocity of gas flow through the orifice can be 100 times that through the wall opening. Beyond and near the nozzles 8 the conduits are provided with cold gas nozzles 14 adapted to direct rapid jets of cold gas into the jets of hot gas delivered by the conduit constrictions 8. The cold gas nozzles are so placed that cold gas is mixed with the hot gas delivered by the conduit constrictions, the temperature of the resulting mixture of gases being thus controllable. The conduits are connected directly through these constrictions to refractory heat insulated chambers 15 which are of large size adapted to allow a settling of solid and liquid material carried in the gas. Chambers 15 contain refractory lump and fibrous filtering material 16 in layers adapted to aid in removing saline fumes from passing gases. Suitable refractory filtering materials are coke, charcoal, burnt lime, calcined magnesite, steel wool, alloy steel turnings, and the like. The chambers are made accessible at top and bottom through plugged openings 17. Plugged tapping holes 18 at the bottom of the chambers are adapted to removing molten matter collecting in the chambers. From near the bottom of chambers 15 lead gas conduits 19 to hot gas main 20 which, as shown, is common to all the hot gas outlets. To hot gas main 20 are connected in parallel two or more metallic heat recuperators 21 which may be provided with gas inlet valves 22. As shown, each recuperator is adapted to cause the gas, distributed by expansion headers 23, to descend inside of metal tubes 24 (which may be of thin steel coated with chromium or aluminum) while cold air from the blowing engines, admitted through valve 25, ascends outside of tubes 24, becomes heated as the gas cools and flows through air outlet 26 into hot air main 27 and thence through the bustle pipe 3 to the tuyères 2. Air line 28 comes from the blowing engines (not shown). Gas valves 29 are provided in the gas outlet of each recuperator delivering into cooled gas line 30 going to the power plant for the blowing engines. From this cooled gas line 30, gas blower 31 pumps cold gas through valved pipe 32 into nozzles 14 to be injected into the hot gas from the furnace entering chambers 15.

At the top of furnace 1 near the usual bell and hopper filling and distributing devices are shown in diagram spent gas outlets 33 with downcomers 34, dust catcher 35 and waste gas disposal pipe 36.

In operation, after having been started with cold air, the gas lines having been at the start filled with steam or other inert gas and the furnace being kept filled with coke, ore and flux, the plant is primarily energized by the combustion to CO of air oxygen blown through the tuyères to react with the coke. The combustion gases, initially under substantial pressure, usually about two atmospheres, and at a temperature around 2800° F., ascend through the furnace with a progressive drop in pressure and temperature and find exit from the furnace through hot gas outlets 5 and spent gas outlets 33, the relative outflow through the two sets of outlets being adjusted by means of the adjustable nozzles 8; the effective area of outlets 5 and conduits 7, the velocity of gas flow therein and the pressure inside the furnace being determined by the area of the narrow-conduit constrictions 8; the pressure drop through the constrictions and hence the gas flow through the hot outlet system being modifiable by gas valve 29 beyond recuperator 21. The large upwardly directed conduits with narrow nozzled passages constitute means for withdrawing relatively large amounts of very hot gases from the furnace without carrying out troublesome amounts of coke etc. The movable plug 11 affords means of varying the amount and velocity of gas flow through each individual outlet. Cold gas nozzles 14, supplied through valved pipe 32 with cold gas from pipe 30, are adapted to inject jets of cold gas at a high velocity into the jets of hot gas streaming through constrictions 8 and thus provide means of controlling the temperature of the gases in chambers 15 and of aiding condensation and settling from the gas of saline matter, such as alkali cyanid, carried as vapor in the gas as it leaves the furnace. The narrow conduit constrictions with their cold gas nozzles deliver rapid jets of hot and cold gas mixing and slowing down in the upper spaces of chambers 15 which act both as settling and as filtering chambers. The refractory throttled constrictions 8 in conjunction with valve 29 in the cold gas line afford means for controlling the proportion of the fuel energy which is made available for smelting work in the furnace. With this control it becomes practicable to so adjust the ratio of ore burden charged with the coke that substantially all the energy of the gas flowing up through the shaft may be used, the portion of the gas leaving the furnace at 33 being substantially spent, containing little CO and $H_2$ and little sensible heat. The plant thus lends itself to a rejection by the furnace of any desired proportion of the fuel energy in the form of sensible heat and latent combustion energy of the gas issuing through the hot gas outlets and the proportion of rejected energy can be fixed within narrow limits. Furthermore, the assembly lends itself to a direct, ready continuous and more or less automatic recuperation of sensible heat from the rejected gas and its return as blast heat to the combustion zone, for, directly as the rate of hot gas diversion varies so varies the quantity of heat delivered to the recuperators, likewise the consequent temperature of the blast and the rate of heat return. Moreover, with nozzles 8 and cold gas valves 29 set, hence with a fixed proportion of gas caused to rise through the shaft and with the burden adjusted accordingly, a temporary deficiency of heat in the furnace can be readily supplied by increasing the rate of air blowing and thus of combustion, thereby immediately raising the gas pressure inside the furnace, automatically increasing the gas flow through the hot gas outlet system and supplying the increase of sensible heat needed in the increased blast volume, at the same time increasing the supply of gas required for the additional air blowing. Thus the plant affords means for direct control both of demand for gas and of its supply.

The described plant assembly is particularly adapted to operation of the iron smelting process using a moderate blast temperature, that is, a limited amount of blast heat, with diversion of a limited amount of hot gas. For example, with blast temperatures below 500° F. and a diversion of the equivalent of less than 25 per cent of the combustion gases at temperatures around 2300° F., the described throttled constrictions in the gas outlets, connected filtering chambers and direct acting heat interchangers can, without other means of blast heating, maintain adequate blast temperatures and thus continuously return to the furnace enough heat to hold the required smelting temperature therein. And should the demand for heat in the hearth be for any reason increased during operation, means for raising the blast temperature by increasing the flow of hot gas to the heat interchanger is immediately available in valve 29 and throttle constrictions 8; the invention thus providing ready means for raising or lowering the blast temperature by increasing or decreasing the rate of hot gas delivery to recuperators 21.

In the operation of the plant assembly, chambers 15 constitute an important element with relation both to throttled constrictions 8 and to heat recuperators 21. The throttled constrictions deliver hot gas to the filtering chambers with a sudden release of pressure and a swift swirling motion succeeded by a slowing down of the gas flow in the wide upper spaces of 15. This churning action, which may be aided by the nozzle effect in the cold gas entering at 14, is conducive to condensation and settling from the gas of fumiform matter such as cyanid and other substances carried as vapors in the gas from the furnace. Such matter is collected by filtering materials 16 and itself serves as filtering means. In this way the filtering chambers, being maintained at suitable temperatures through control of the admission of cold gas at 14, act both to recover saline byproducts, notably cyanid, in molten form and to clean the gas before it enters the heat recuperators. The filtering material can be renewed when necessary.

The described assembly makes possible the smelting of iron ores with an economy which is entirely beyond the range of the standardized plant now commonly used. It constitutes a means for substantial improvement of the methods disclosed in prior patents in which high blast heats and low rates of hot gas diversion are features. An important improvement is in the quality of the pig iron produced with a moderately heated blast. The assembly gives improved control of the gas producing function of the blast furnace smelting iron and of the quality of the by-product fuel gas as well as of its availability for power purposes. It is useful also in carrying on a process of gasifying solid carbonaceous fuel with air and alkali in which a substantial proportion of the air nitrogen is fixed and recovered as cyanid with or without a by production of iron. The combination of large outlet conduits, small pressure releasing constrictions and large chambers receiving swift streams of gas from the nozzles, together with means for somewhat reducing the temperature of the gas through admixture of fractional amounts of previously cooled gas, constitutes improved means of withdrawing hot vapor-laden gases from blast furnaces, minimizing the labor and attention involved in maintaining hot gas outlets.

We claim:—

1. A blast furnace having relatively wide, refractory heat insulated conduits for leading cyanide vapor laden gas from the hot zone of the furnace above the air tuyères into chambers adapted to remove condensable saline matter from said gas, each of said conduits being connected to a separate saline removing chamber, said connection between each conduit and its respective chamber being a short, narrow, refractory, heat insulated, jet-forming, constriction in said conduit, said constriction having a cross sectional area equal to a minor fraction of that of said conduit and being adapted to produce a nozzle effect in the gas stream and thus to deliver into said chamber a rapid, swirling jet of expanding, cooling gas.

2. A blast furnace having relatively wide, refractory, heat insulated conduits for leading saline-vapor-laden gas from the hot zone of the furnace above the air tuyères, each conduit delivering through a short, narrow, refractory, heat insulated, jet forming constriction with a nozzle effect into a separate chamber for cleaning the gas at an elevated temperature by condensing, settling and filtering saline matter therefrom, said gas cleaning chambers being connected through a common gas main to heat interchangers adapted to continuously cool the cleaned gas by transfer of sensible heat therefrom to the air blown into the furnace.

3. In a blast furnace assembly for smelting iron ores with coke and preheated air a plurality of upwardly directed, heat insulated, refractory conduits of relatively large cross-sectional area adapted to divert gases at moderate velocity from the hot zone of the furnace above the air tuyères, the effective area of each gas conduit being limited by a short, narrow, refractory, heat insulated, jet-forming constriction located in the conduit at an upper level, each constriction delivering gas directly with a nozzle effect into a combined condensing, settling and filtering chamber for removing saline matter from the gas, each conduit being provided near its constriction with a nozzle adapted to inject a rapid jet of cold gas into the jet of hot gas streaming through said constriction into said chamber.

4. A blast furnace assembly comprising a blast furnace having wide openings in the wall surrounding the hot zone above the tuyères, upwardly directed, heat insulated, wide refractory gas conduits connected to the wall around said openings, a short, narrow, refractory, heat insulated, jet-forming nozzle in the upper portion of each conduit, a refractory, heat insulated chamber of substantial size taking the gas flow directly from each nozzle, said chambers being adapted to clean said gas by removing saline matter therefrom while still at an elevated temperature, one or more heat interchangers taking gas from said chambers and adapted to cool said gas by transfer of sensible heat therefrom to the air blast, and valved pipes returning a fraction of said cooled gas to the hot gas nozzles, said pipes ending in nozzles adapted to inject rapid jets of the cooled gas into the jets of hot gas streaming from the hot gas nozzles into said gas cleaning chambers.

5. A blast furnace assembly adapted to smelting iron ores with coke and preheated air which comprises means for diverting a limited amount of gas under pressure from the hot zone of the furnace, said means including a wide, heat insulated conduit having a narrow, short, heat insulated, refractory, jet-forming nozzle converting pressure into velocity and limiting the lineal velocity of gas flow from within the furnace, means for injecting a jet of cold gas into the jet of hot gas streaming through said nozzle, means for removing saline matter from the combined gases while still at an elevated temperature and means for heating the air blast to a moderate temperate by transfer thereto of sensible heat from said combined gases.

6. A blast furnace having openings in the wall surrounding the hot zone, a refractory conduit attached to the wall around each of said openings and a pressure releasing throttle in each conduit comprising shaped refractory material forming a tapered interior space having an apex of substantially smaller cross-sectional area than that of said wall opening.

7. A blast furnace having an opening in the wall surrounding the hot zone, a refractory conduit attached to the wall around said opening and a pressure releasing throttle in said conduit comprising shaped refractory material forming a tapered interior space having an apex of substantially smaller cross-sectional area than that of said wall opening and widening out from said apex to a substantially larger cross section.

8. A blast furnace having an opening in the wall surrounding the hot zone, a refractory conduit attached to the wall around said opening and a pressure releasing throttle in said conduit comprising shaped refractory material forming a tapered interior space having an apex of substantially smaller cross-sectional area than that of said wall opening, widening out from said apex to a substantially larger cross section and a refractory removable plug inserted through an opening in said refractory material to engage with said tapered interior space near its apex.

9. A blast furnace having a number of relatively wide openings in its wall at a level somewhat above that of the air tuyères, a refractory, heat insulated conduit attached to the furnace wall around each of said openings, each of said conduits having at a point removed from the furnace a short, narrow, refractory, heat insulated jet forming constriction with a movable refractory plug engaging therewith and adapted to adjust the effective area of its respective conduit.

10. A blast furnace having a plurality of wide, refractory, heat insulated conduits leading gas and saline vapors from the hot zone of the furnace above the air tuyères, each of said conduits having at a point removed from the furnace a short, narrow, refractory, heat insulated, jet forming constriction directly delivering gas with a nozzle effect into a combined cooling, settling and filtering chamber.

11. A blast furnace assembly comprising means of outlet for saline vapor-laden fuel gases from the furnace at a level somewhat above that of the air tuyères, means for conducting said gases away from the furnace, said conducting means comprising a wide, refractory, heat insulated, conduit having a short, narrow refractory, heat insulated, jet forming adjustable constriction regulating the velocity of gas flow from the interior of the furnace, a chamber near said constriction receiving the jet of gas therefrom and adapted to condensing and removing saline matter from said gases, connected means for heating the air blast by transfer thereto of sensible heat from said gases after removal of salines and connected valved means of conveying said gases after said heat transfer to means for blowing the air into the furnace, all of the foregoing means being adapted to raise or lower the blast temperature by respectively increasing or decreasing the rate of hot gas flow from the furnace.

12. A blast furnace assembly comprising a blast furnace, a wide heat insulated gas conduit communicating with the hot zone of the furnace, a short narrow refractory constriction in said conduit forming therein a jet forming nozzle, a movable refractory plug in said constriction adapted to varying its cross-sectional area, a nozzled cold gas inlet in said conduit near said constriction, a combined settling and filtering chamber receiving gases from said conduit through said constriction and a heat interchanger communicating with said chamber and also with a valved gas pipe leading to the power generators for the blowing engines, said heat interchanger being also in the air blast line leading from the blowing engines to the furnace.

In testimony whereof, we affix our signatures hereto.

RICHARD FRANCHOT.
K. P. McELROY.